United States Patent [19]

Lindquist

[11] 4,433,860
[45] Feb. 28, 1984

[54] ADJUSTABLE FLANGED FITTING FOR ROOF OPENINGS

[76] Inventor: William W. Lindquist, 190 Clarencedale Ave., Youngstown, Ohio 44512

[21] Appl. No.: 198,770

[22] Filed: Oct. 20, 1980

[51] Int. Cl.³ .............................................. F16L 5/00
[52] U.S. Cl. ...................................... 285/192; 285/42; 285/205; 285/414; 285/415; 285/DIG. 16
[58] Field of Search ............... 285/192, 414, 205, 415, 285/206, 303, 161, 42, DIG. 16; 248/56; 403/259, 261, 256

[56] References Cited

U.S. PATENT DOCUMENTS

| | | | |
|---|---|---|---|
| 1,352,248 | 9/1920 | Coar | 285/4 |
| 1,710,060 | 4/1929 | Metcalf | 285/159 |
| 1,809,250 | 6/1951 | Pendleton | 240/56 X |
| 1,809,413 | 6/1931 | Hirshstein | 285/42 |
| 1,833,187 | 11/1931 | Stringer | 285/42 |
| 1,870,274 | 8/1932 | Wulfert et al. | 285/205 |
| 2,490,075 | 12/1949 | Matheis | 285/42 X |
| 2,615,362 | 10/1952 | Churchman | 285/205 X |
| 2,787,203 | 4/1957 | Smith | 403/259 |

FOREIGN PATENT DOCUMENTS 493320  8/1918  France ................................. 285/4

Primary Examiner—Dave W. Arola
Attorney, Agent, or Firm—Harpman & Harpman

[57] ABSTRACT

A tubular fitting with an annular flange inwardly of its ends has adjustable clamping devices spaced with respect to the flange and enabling the fitting to be secured in an opening in a roof or the like and about a structural member or a pipe extending therethrough so as to form a weather tight seal thereabout. The fitting is preferably formed in two half sections to facilitate installation.

4 Claims, 7 Drawing Figures

ADJUSTABLE FLANGED FITTING FOR ROOF OPENINGS

BACKGROUND OF THE INVENTION

(1) Technical Field

This invention relates to fittings that define a tubular passageway and are arranged to be positioned in an opening in a roof, floor or the like about a structural member or pipe extending through said opening so as to form a closure thereabout.

(2) Description of the Prior Art

Prior devices of this type may be seen in U.S. Pat. Nos. 1,352,248, 1,833,187 and French Pat. No. 493,320.

In U.S. Pat. No. 1,352,248 a tubular member extending through the roof opening requires a secondary flanged tubular member to effect a seal.

In U.S. Pat. No. 1,833,187 a clamping ring having depending legs is secured to the pipe above the fitting and arranged to exert tension downwardly against the roof or floor through which the fitting is positioned.

In the French patent a flanged semi-conical metal fitting is positioned about the pipe above the roof to form a closure. The other prior art comprises my copending patent applications Ser. Nos. 080,077 now U.S. Pat. No. 4,243,251 issued June 6, 1981 and 118,755 now U.S. Pat. No. 4,306,738 issued Dec. 22, 1982. No prior art is known wherein clamping means are secured to a two-part tubular member below an annular flange thereon so that the fitting may be adapted to various thicknesses of roofs, floors or the like having openings therein in which the fitting is positioned to form a whether tight closure with respect to an article extending therethrough.

SUMMARY OF THE INVENTION

An adjustable flanged fitting for roof openings has a tubular member with an annular flange extending outwardly therefrom and positioned inwardly of the ends thereof and a plurality of adjustable clamping members spaced with respect to the flange with the clamping members being arranged for various desirable locations in spaced relation to the flange and wherein the tubular member is formed in registering half sections, each being of a configuration comprising a half circle and provided with means for securing the half sections to one another.

DESCRIPTION OF THE PREFERRED EMBODIMENT

Figure 1:
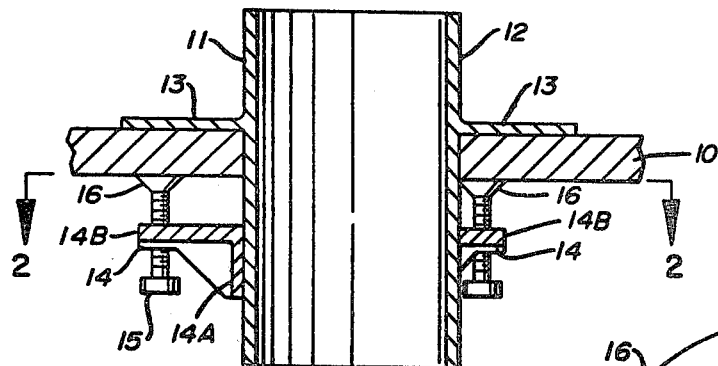
FIG. 1 is a cross sectional side elevation of the adjustable flanged fitting.
Figure 2:
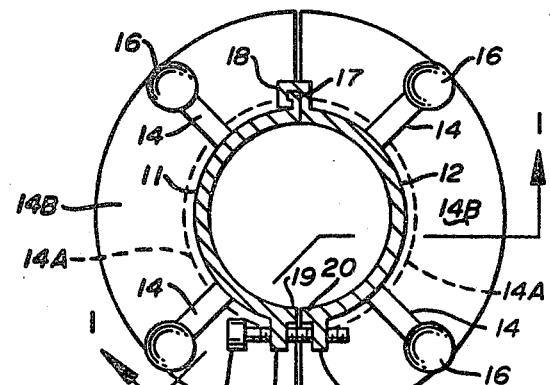
FIG. 2 is a horizontal section on line 2—2 of FIG. 1.

By referring to the drawings and FIGS. 1 and 2 in particular, it will be seen that an adjustable flanged fitting is shown positioned in an opening in a section of a roof 10, the fitting comprises oppositely disposed matching half circular body members 11 and 12, each of which has half of an outwardly extending flat annular flange 13 thereon inwardly of the ends thereof. A plurality of circumferentially spaced radially extending apertured brackets 14 are attached to the outer surfaces of the half circular body members 12 in spaced relation to the half flanges 13 thereon. The apertures in the brackets 14 are threaded and threaded bolts 15 are positioned through the threaded apertures with the upper ends of the bolts provided with enlarged ends 16.

In FIG. 2 of the drawings, the cross sectional elevation of the device of FIG. 1 shows that the half circular body members 11 and 12 have longitudinally extending engaging configurations at their meeting edges with the configurations on one side of the body members 11 and 12 forming longitudinally interlocking flanges 17 and 18 and the configurations on the other side forming abutments 19 and 20 with outwardly extending ribs 21 and 22 provided with threaded apertures through which bolts 23 are positioned so that the half circular body members 11 and 12 can be secured to one another in water tight relationship when the adjustable flanged fitting has been positioned in an opening in a roof as for example about a structural member or a pipe extending therethrough.

It will occur to those skilled in the art that the portion of the tubular member formed of the half circular body members 12 and 13 extends above the annular flange 13 so that a simple roof sealing compound may be used to prevent water from entering the area between the flange 13 and the roof 10 and the abuting portions of the half circular body members 11 and 12.

Additionally those skilled in the art will observe that a conventional semi-conical metal or plastic body member may be positioned over the open upper end of the joined body members 11 and 12 and secured about the structural member or pipe extending therethrough and that the resulting construction being located substantially above the surface of the roof 10 provides an efficient and flexible weather seal.

It will also occur to those skilled in the art that the roof 10 and the adjustable flanged fitting disclosed herein may move responsive to expansion and contraction due to temperature changes and without affecting the seal between the roof and the structural member or pipe positioned through the fitting as aforesaid.

It will occur to those skilled in the art that changes in the mounting of the brackets 14 as seen in FIGS. 1 and 2 of the drawings may be made.

In FIGS. 1 and 2 of the drawings, the brackets are arranged to be cemented to the exterior of the half circular body members 11 and 12 either prior to or at the time of installation of the fitting in the roof opening so that they can be spaced a desired distance with respect to the annular flange 13.

Figure 3:
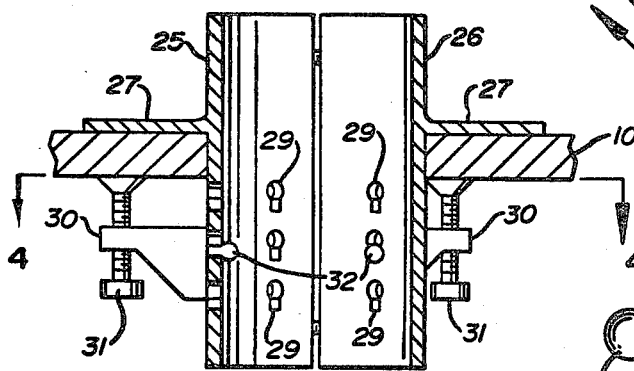
FIG. 3 is a cross sectional side elevation of a modified form of the invention.
Figure 4:
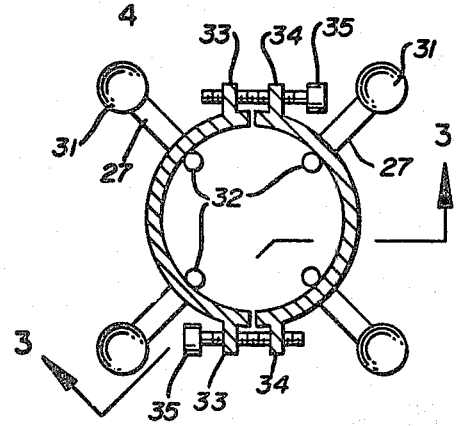
FIG. 4 is a horizontal section on line 4—4 thereof. Section lines 3—3 on FIG. 4 illustrate the cross section of FIG. 3.

In FIGS. 3 and 4 of the drawings, a first modification is illustrated in which the half circular body members are indicated by the numerals 25 and 26 and the annular flange formed thereon by the numeral 27. A plurality of key-hole shaped openings 29 are formed in vertical rows in each of the body members 25 and 26 and a plurality of circumferentially spaced radially extending brackets 30 having threaded apertures therein and bolts 31 positioned in the threaded apertures are adjustably secured to the body members 25 and 26 by pins with enlarged heads 32 formed on the inner ends of the brackets 30.

The pins with enlarged head 32 are arranged to register with the keyhole shaped openings 29.

By referring to FIG. 4 of the drawings, it will be seen that the configurations joining the vertically positioned edges of the half circular body members 25 and 26 comprise ribs 33 and 34 formed adjacent the abuting edges of the half circular body members 25 and 26 and in spaced parallel relation to one another. Threaded apertures are formed in the ribs 33 and 34 and bolts 35 are positioned therethrough so that the adjustable flanged fitting can be held in assembled relation thereby.

Figure 5:
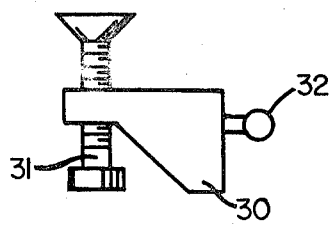
FIG. 5 is a side elevational detail of one of the adjustable clamping devices seen in FIGS. 3 and 4.

In FIG. 5 of the drawings, one of the plurality of brackets 30 may be seen in enlarged detail and it will be observed that the pin with the enlarged head 32 is so formed that the head portion is spaced with respect to the bracket 30 a distance slightly less than the thickness of the half circular body members 25 and 26.

Figure 6:
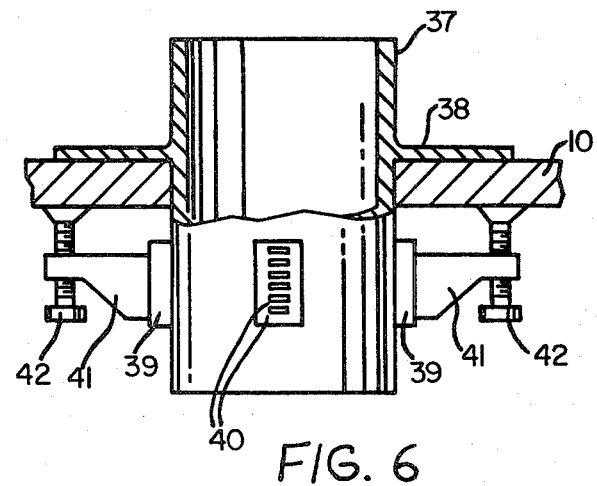
FIG. 6 is a side elevation with parts broken away and parts in cross section illustrating a further modification of the adjustable flanged fitting.
Figure 7:
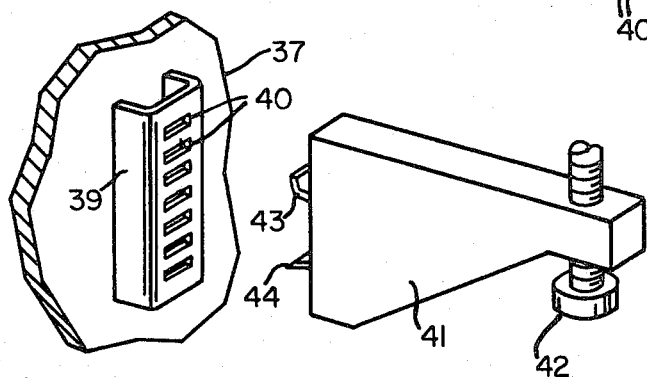
FIG. 7 is an exploded view showing portions of the device of FIG. 6.

A still further modification of the device of the invention is possible and desirable and by referring to FIGS. 6 and 7 it will be seen that the tubular body member forming the main body of the device is an integral tubular section 37 with an annular outstanding flat flange 38 thereabout and provided with a plurality of circumferentially spaced channel-like body members 39 on its exterior surface, each of the channel-like body members 39 having a vertically arranged row of slots 40 therein. A matching plurality of brackets 41 have apertures in their outer ends with threaded bolts 42 positioned through the apertures and arranged for clamping engagement against the roof 10.

Each of the brackets 41 has a vertically spaced pair of projecting hooks 43 and 44 respectively thereon which will engage the vertically spaced apertures 40 in the channel like body members 39 when the uppermost hook 43 is first engaged in one of the slots 40 and the lower hook 44 moved into a lower slot 40 as occurs when the bracket 41 is moved from a tilted to a horizontal position as shown in FIG. 6 of the drawings.

By referring again to FIGS. 1 and 2 of the drawings, it will occur to those skilled in the art that if desired the plurality of brackets 14 on each of the half circular body members 11 and 12 can be positioned on a half circular collar 14A which may also include a secondary annular flange 14B. Such a modification positioning the brackets 14 on the half circular collars 14A increases the area which can be used for cementing the brackets 14 and the collars 14A to the assembled half circular body members 11 and 12.

Although but three embodiments of the present invention have been illustrated and described, it will be apparent to those skilled in the art that various changes and modifications may be made therein without departing from the spirit of the invention and having thus described my invention

What I claim is:

1. An adjustable flanged drainage fitting for roof openings consisting of a vertically disposed tubular member having upper and lower ends and having an integral horizontally disposed outwardly extending annular flange thereon below the upper end thereof, a plurality of radially extending brackets and means attaching said brackets to said tubular member between said annular flange and the lower end of said tubular member, vertically disposed threaded openings in said radially extending brackets, said radially extending brackets arranged in circumferentially spaced relation to one another and in spaced relation to said annular flange, vertically disposed threaded bolts threadably engaged in said threaded openings in said brackets arranged for movement toward and away from said annular flange in a clamping-like action when rotated.

2. The adjustable flanged fitting set forth in claim 1 and wherein said tubular member comprises two half circular portions, each having straight edges arranged with their straight edges abutting one another and wherein and integral outwardly extending annular flange is formed in two parts respectively carried on the two parts of said tubular member and wherein outturned flanges on the straight edges of the two parts of the tubular member are apertured to receive fasteners arranged to hold the two parts of the tubular member in assembled relation.

3. The adjustable flanged fitting set forth in claims 1 or 2 and wherein said means attaching said brackets to said tubular member consists of a collar slidably engaged on the exterior of said tubular member, means attaching said brackets to said collar, means on said collar for securing the same on said tubular member in adjusted position with respect to said outwardly extending annular flange.

4. The adjustable flanged fitting set forth in claim 1 and wherein said collar is formed in two half circular parts.

* * * * *